Aug. 22, 1967 W. F. UNDERWOOD ETAL 3,337,665
METHOD FOR THE PRODUCTION OF THERMOPLASTIC FILM
Original Filed Oct. 12, 1964 2 Sheets-Sheet 1

INVENTORS
WILLIAM F. UNDERWOOD
JOSEPH N. CRAVER, JR.
WILLIAM SACKS

BY *James C. Arrantia*
ATTORNEY

United States Patent Office 3,337,665
Patented Aug. 22, 1967

3,337,665
METHOD FOR THE PRODUCTION OF
THERMOPLASTIC FILM
William F. Underwood, Oak Park, Ill., and Joseph N. Craver, Basking Ridge, and William Sacks, Gillette, N.J., assignors to Union Carbide Corporation, a corporation of New York
Original application Oct. 12, 1964, Ser. No. 410,842. Divided and this application Apr. 27, 1966, Ser. No. 560,917
21 Claims. (Cl. 264—95)

This application is a division of copending application Ser. No. 410,842 filed Oct. 12, 1964, which in turn is a continuation-in-part of application Ser. No. 770,844, filed Oct. 30, 1958, now abandoned.

This invention relates to a method for the production of tubular thermoplastic film. More particularly, this invention relates to a method for the production of biaxially oriented thermoplastic film which has improved physical properties such as tear strength, tensile strength and the like and which can be rendered dimensionally stable at elevated temperatures, without affecting its excellent physical properties.

Up until the present time, it has not been possible to produce tubular film material from low melt-viscosity thermoplastic polymers, that is, thermoplastic polymers which are not self-sustaining in their molten state. Such polymers do not have sufficient body, in their molten state, to be extruded or otherwise formed into tubular film material.

The present invention provides thin-walled continuous self-sustaining tubular film characterized by uniform thickness, produced from thermoplastic materials having low melt-viscosities.

The present invention also provides for the production of biaxially oriented seamless tubing from crystalline polymers such as polyolefins, linear polyesters, polyamides, polyurethanes and condensation polymers in general which have low melt-viscosities.

More particularly, the present invention provides for the production of biaxially oriented tubular film from polyethylene terephthalate, which can be rendered dimensionally stable at elevated temperatures, and which is excellently suited for use as packaging material for poultry and other like food products. The polyethylene terephthalate film, produced in accordance with this invention, is uniformly strong, does not require a pretreating step in order to render it capable of being heat sealed to itself and when heat sealed forms seals which are strong. Also since the product is already formed into a seamless tube it is uniquely adaptable for the packaging of poultry, meat and the like without any modification by merely clipping or tying the open ends to effect closure.

In one aspect of the present invention, a thermoplastic polymer having a low melt-viscosity at its extrusion temperature such that it is non-self-sustaining in the molten state is extruded through an annular orifice and onto a melt of a supporting thermoplastic polymer having a high melt-viscosity at its extrusion temperature such that it supports both itself and the low melt-viscosity polymer while in the molten state, the supporting thermoplastic polymer being simultaneously and concentrically extruded through an adjacent annular orifice, into contact with the low melt-viscosity thermoplastic polymer to form concentric layers of seamless polymeric tubing, maintaining the walls of the tubings distended and subsequently separating the high melt-viscosity seamless tubing from the low melt-viscosity seamless tubing.

In general, the objects of this invention are accomplished by melt-extruding a thermoplastic material having a low-melt-viscosity through an annular orifice and onto a melt of a supporting high melt-viscosity thermoplastic material simultaneously and concentrically extruded parallel thereto, to form concentric layers of seamless tubing. The concentric layers are continuously withdrawn and constricted at a point spaced from the point of extrusion. A bubble of a gaseous medium is maintained in the tubing between the point of extrusion and the point of constriction to distend the tubing to the desired diameter. Near the point of extrusion, the thermoplastic polymers are passed through a gaseous medium of such temperature as to cool the layers of tubing in contact with each other to an extent that when the tubing has been inflated by said bubble to the determined diameter it will be in a set condition. It should be noted that the high melt viscosity material can be extruded exterior or interior to the point of emergence of the low melt-viscosity material from the die orifice.

The concentric seamless tubings can, if desired, be separated as by slitting and separating the outer tubing, from the inner seamless tubing. The tubing of the low melt-viscosity polymer can then be further treated.

This further treatment comprises biaxially orienting the film by expanding a continuous length of the tubing composed of the low melt-viscosity film. This orientation is accomplished by introducing and maintaining in the tube an isolated bubble of a gaseous medium and simultaneously impinging circumferentially on said tubing, heat, in such a manner that the tubing is maintained at a temperature between the melting point of the polymeric film and about the second order transition temperature thereof, in which temperature range the tubing is drawable. The tubing is then stretched to effect biaxial orientation.

In the case of some polymers, such as polyethylene terephthalate or poly m-xylylene adipamide, the biaxially oriented polymeric film thus obtained is shrinkable at relatively low temperatures. If it is desired to "crystallize" or "stabilize" these films, i.e., render them substantially non-shrinkable up to temperatures of about 120° C., the flattened biaxially oriented tubing is again expanded by inflation with air or other gaseous media to prevent shrinkage and heated to a temperature in excess of the second order transition temperature of the polymeric film but below the melting point thereof. This temperature is preferably that at which the crystallization rate is maximum.

The process may be more readily understood when described with reference to the accompanying drawings, wherein polyethylene terephthalate is employed as an example of a low melt-viscosity thermoplastic material, and polyethylene is used as the high melt-viscosity thermoplastic supporting polymer.

Figure 1:
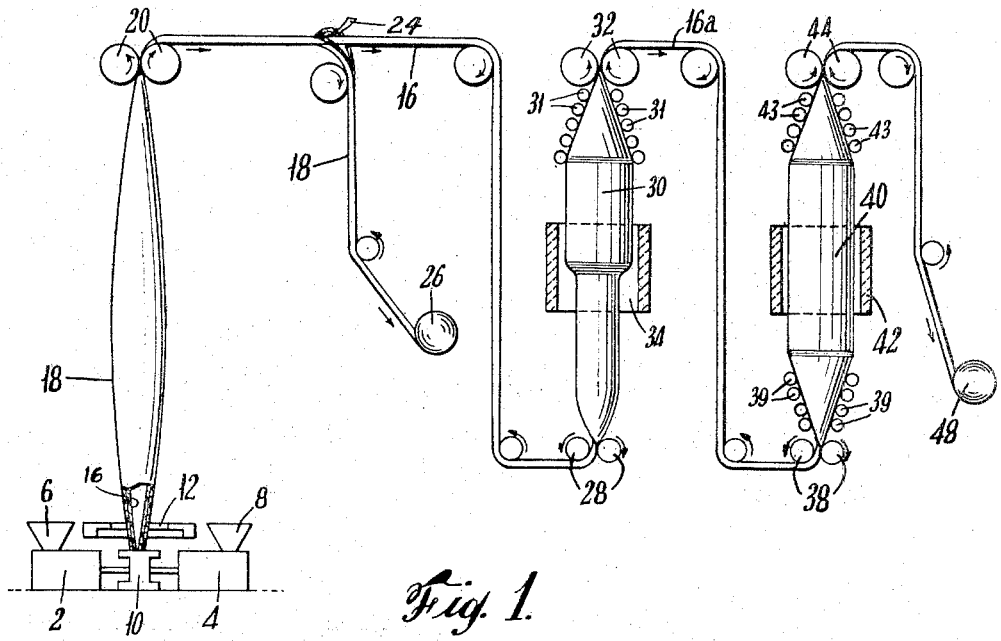
FIGURE 1 is a schematic illustration showing the continuous production of an amorphous film and the subsequent orientation and thermal stabilization of the oriented crystalline thermoplastic polymer.
Figure 2:
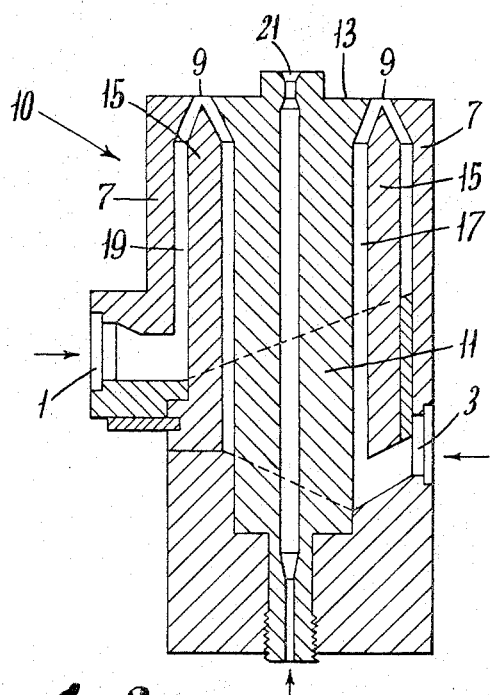
FIGURE 2 is a vertical section through the die and nozzle, showing the relationship of the parts.

Referring now to the drawings, wherein like reference numerals designate like parts, the reference number 2 in FIGURE 1 designates a conventional extruder provided at one end thereof with a feed hopper 6 which feeds the supporting high viscosity thermoplastic polymers such as polyethylene into the screw chamber of the extruder, not shown. As the thermoplastic polymer is fed by the screw, through the extruder, it is molten and in the molten condition it is fed to the die 10 secured to the extruder by appropriate means. Extruder 4, similarly provided with a hopper 8 and also attached by appropriate means to die 10, is used to feed the low melt-viscosity thermoplastic polymer such as polyethylene terephthalate in a molten condition to the die 10. The die 10, as shown in FIGURE 2, is comprised of an outer housing or shell 7 which terminates at orifice 9. A die insert 11 is positioned and maintained in spaced relationship within the outer housing 7. The die insert 11 is comprised of a cylindrical extension 13 cooperating with the outer housing 7 to form the annular orifice 9, and an annular dividing ring 15. The annular dividing ring 15 is spaced from the cylindrical extension to form an annular channel 17. The annular channel 17 terminates at the interior end of orifice 9. The other end of channel 17 is connected to a supply source from the extruder 4 by means of opening 3. The dividing ring 15 is also spaced from the inner surface of the housing 7 to provide a second annular channel 19 which terminates at the interior end of orifice 9 and is supplied by extruder 2 by means of opening 1.

The dividing ring 15 separates the annular channels 17 and 19 to a point of convergence in close proximity to the entrance to orifice 9. This allows the flow of thermoplastic in a molten condition from the two channels to converge and form two concentric tubes and to emerge in such form from annular orifice 9. The concentric tubes 16 and 18 after emergence are shown in FIGURE 1. The die insert 11 is provided with a central orifice 21 connected to a supply of a gaseous medium, not shown, whereby the gaseous medium can be introduced into the interior of the tubing to maintain the tubing inflated. A valve, not shown, is adapted to the supply line so that when the desired inflation or supply of the gaseous medium is reached, the flow can be cut off. Conversely, if a greater supply of the inflating medium is needed, for example, due to a flaw in the tubing causing gas to escape, the requisite quantity can be added.

Referring again to FIGURE 1, the inflated concentric tubings 16 and 18 formed by extrusion through the die 10 pass vertically upward through a cooling zone 12 which serves to chill and set the expanding concentric tubing at a point where they have reached the desired diameter. The inflated concentric tubings are drawn from the die 10 in substantially vertical travel, through the cooling zone 12 and then through a pair of squeeze rolls 20 rotating at a controlled speed, said squeeze rolls 20 also serving to collapse the concentric tubing.

In the embodiment wherein a tubing of polyethylene terephthalate is desired and the concentric seamless tubings are comprised of an outer layer of polyethylene and an inner layer of polyethylene terephthalate it is preferred that the outer tubing of polyethylene be removed and the polyethylene terephthalate tubing be oriented and stabilized as a unitary tubing. This is done as follows: after the concentric tubes travel through the squeeze rolls 20, they are passed through a suitable slitting device 24, and the outer tubing 18 slit and separated from the inner tubing and wound on a wind-up reel 26.

To biaxially stretch and orient the polyethylene terephthalate thermoplastic seamless tubing, which is in the amorphous state, it is passed through the nip of squeeze rolls 28, heated as it passed through radiant heater 34, contacts converging rolls 31, and is then passed through the nip of squeeze roll 32 (squeeze roll 32 is usually rotated at greater peripheral speed than squeeze roll 28 to take up the additional length formed when the tubing is stretched and to impart additional machine direction stretch). Between squeeze rolls 28 and 32, the tubing is inflated with air sufficient to inflate the tubing and to distend the tubing radially to the desired extent when heated. The amount of entrapped air in the bubble 30 is considered sufficient when the desired final diameter of the tubing or desired radial distention is obtained.

If during processing the amount of air in the bubble 30 is reduced, the squeeze rolls 32 are lowered to increase the air pressure.

The polyethylene terephthalate tubing 16 after leaving squeeze rolls 28 is passed with clearance through the core of a tubular radiant heater 34, contacts converging rolls 31, and is flattend by squeeze rolls 32. The amorphous inflated tubing is heated to approximately its second order transition temperature wherein the thermoplastic polymer changes to a drawable state and can be readily stretched to obtain a film which is oriented in both the machine and transverse directions.

At temperatures below about the second order transition point the polyethylene terephthalate amorphous film is brittle and shatters readily when expanded or stretched.

The oriented tubing 16A is heat shrinkable and can be reeled at this point. If it is desired to obtain a heat stable film, the oriented tubing 16A is passed through a pair of squeeze rolls 38, contacts diverging rolls 39, is heated as it passes through the core of a tubular radiant heater 42, contacts converging rolls 43, passes through a second set of squeeze rolls 44 and is wound up on wind-up reel 48. An entrapped bubble of air 40 is maintained to inflate the tubing and keep it taut to prevent shrinkage while it passes through heater 42. The two sets of squeeze rolls are operated at about the same peripheral speed to minimize longitudinal dimensional changes. For stabilizing the film again subsequent shrinkage, the film is heated to a temperature higher than its second order transition temperature but lower than the polymer melting point. Preferably, the temperature used is that at which the maximum rate of crystallization occurs. The correlation of the length of the heater, the temperature and the speed of the film determine the desired crystallization.

It is to be noted that as the crystallinity of the film is increased, as measured by X-ray analysis, the temperature required for shrinkage increases.

In general, crystallizing at a particular temperature stabilizes the film to shrinkage up to at least that temperature. However, if the time to which the film is subjected to the crystallization temperature is increased, the film can be stabilized to shrinkage at even high temperatures.

Figure 3:
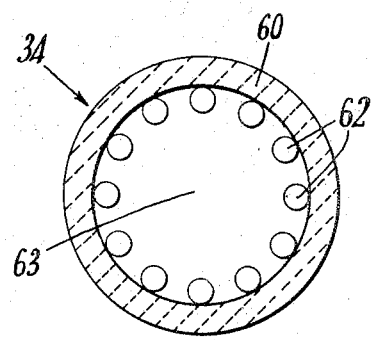
FIGURE 3 is a cross-section through a radiant heater.

The heating device 34 shown in FIGURE 3 is a tubular radiant heater having a core of sufficient diameter to allow the expanded tubing to pass through with clearance about its circumference. It consists of a cylindrical housing 60 having electrical resistance heating elements 62 equally spaced about the inner circumferenec of the housing. The temperature within the core 63 of the heater is regulated by a tranformer-type control, not shown, connected to the electrical resistance elements. Other types of heating devices may be used, of course.

The process is readily adaptable for obtaining continuous seamless tubing from materials that are too weak, or have melt-viscosities that are too low for the conventional type blow extrusion.

Any conventional type extruder can be used, provided that it will feed the molten thermoplastic polymer continuously and uniformly to the die.

In general, it is preferred that the convergence of the annular channels 17 and 19 in the die 10 be at a point sufficiently removed from the exit opening of the annular orifice 9 so that concentric laminar flow of the molten polymers and uniform layering of one polymer onto the other, without change in the interface boundaries, is accomplished.

Although the formation of concentric tubes has herein been described using concentric annular orifices in the die, and wherein the molten polymers converge prior to emerging from the orifice, other means of uniformly layering the low melt-viscosity polymer onto the supporting polymer as it issues from the die may be used. The supporting polymer may be set or unset at the time of layering but in the embodiment described herein it is preferred that the layering of the polymer be performed prior to the setting of either polymer layer.

The supporting polymer may be either the inside or outside tubing. If it is desired to process the concentric tubings together then the choice of inside or outside supporting of the low melt-viscosity polymer will depend upon the final usage. In general, both methods can be used to obtain a seamless tubing of the low melt-viscosity polymer.

The supporting polymer when molten must be of sufficiently high viscosity to support both itself and the low melt-viscosity polymer during the extrusion and subsequent cooling stages. Also it should be drawable at a temperature below the decomposition point of the low melt-viscosity polymer and preferably it should not decompose at the temperature used during extrusion. Polyethylene having a melt-viscosity, at normal extrusion temperatures (350° F.–600° F.) of 10,000 poises to 200,000 poises can be used. Other polymers such as polystyrene, cellulose acetate, cellulose acetate butyrate, polyvinyl acetals, and the like, having melt-viscosities in this same range can also be used.

The low melt-viscosity thermoplastic polymers that are particularly adaptable for use in the practice of this invention of forming seamless tubing are those having viscosities at the extrusion temperatures (350° F.–600° F.) of the polymer of about 7,000 poises or less. The invention can also be used to form seamles tubing from film forming polymers having melt-viscosities as low as 500 poises or lower.

Linear polyamides, polyesters, polyurethanes, such as, for example, poly m-xylylene adipamide, polyethylene terephthalate, polyhexamethylene adipate, polyhexamethylene sebacate, polycaprolactam, polyurethanes obtained by reaction of hexamethylene diisocyanate and diols such as 1,4-butanediol, are some illustrative examples of polymeric films that can be produced in the form of continuous seamless tubing by the method of this invention.

For the preparation of oriented and crystallized seamless tubing from a thermoplastic polymer, it is preferred to further treat the polymer film removed from the supporting polymer film. As hereinbefore explained, the linear polyethylene terephthalate, when initially extruded and suddenly cooled, is in the amorphous state. The amorphous tubing is brittle and has low tensile strength. No appreciable crystallinity can be observed by means of X-ray diffraction analysis or by density measurements. The tubing cannot be readily drawn at room temperature and has very little shrink when relaxed and subjected to high temperatures.

The amorphous tubing can be converted to a tough, highly shrinkable tubing when the tubing is heated and is biaxially stretched and oriented in the temperature range from about its second-order transition temperature but below that temperature at which the polymer will tend to thin out without appreciable molecular orientation, i.e., at temperatures near the melting point of the resin. By second-order transition temperature is meant that temperature at which a discontinuity is noted in the first derivative of a primary thermodynamic quantity with respect to temperature, and is unaccompanied by the usual latent heat which appears in first-order transition temperatures. It is related to polymer fluidity and yield temperature. Some of the thermodynamic properties that can be observed in determining the second-order transition point are: specific volume, specific heat, density, index of refraction and modulus of elasticity.

Since each polymer composition and rate of heating may affect the observed second-order transition temperature, the optimum orientation temperature and heating rate can be readily determined by simple empirical tests.

For example, referring again to FIGURE 1, a continuous seamless polyethylene terephthalate amorphous tubing, formed by extrusion as the inner tube of concentric tubings as hereinbefore described, and the outer supporting tubing removed, is continuously passed through squeeze rolls 28 and 32, the tubing contains a bubble of air or inert gas maintained between the nip of the squeeze rolls to inflate successive portions of the tubing as it is passed therethrough. The peripheral speed of squeeze rolls 32 is greater than that of squeeze rolls 28 to allow for longitudinal, stretching and orientation. The amount of air or inert gas in the bubble will determine the radial distention or transverse orientation of the polymer. As the tubing travels from squeeze rolls 28 to 32, it passes through an appropriate heating device 34, wherein it is heated, as noted hereinabove, to a temperature from about its second-order transition temperature but below the temperature at which the film will thin out with no appreciable orientation.

When polyethylene terephthalate tubing is passed through the heating device and the film reaches a temperature of about its second-order transition temperature, i.e., about 66° C., the tubing expands at a well defined point, herein called the draw point. The relative position of the draw point along the vertical axis of the heating device is dependent upon such factors as affect the film temperature, i.e., film thickness, relationship of diameter of core of heater to diameter of tubing, linear velocity of film passing through heater, size of heater, heat input to the heater, and the like.

Thus, when the temperature in the heater is increased or the linear film velocity through the heater is reduced, the draw point will be lowered along the vertical axis of the heating device. Conversely, a fall in temperatures, or an increase in linear velocity of the film through the heater will cause the draw point to rise along the vertical axis of the heater.

The temperatures measured in the radiant heater 34 where obtained by inserting the bulb of a glass thermometer into the center of the core 63 of the heater prior to the passage of the tubing through the heater. Temperatures were determined for various transformer settings and these were used as the basis for temperature control in the experiments.

The radiant heating device 34 as previously described is spaced between the upper 32 and lower 28 squeeze rolls. The exact position and size of the heater is not critical but will vary with the physical position of the apparatus, rate of heating, total heating time, size of tubing, and the like.

It is preferred to pass the tubing upwardly during the orientation stage to allow for uniform heating and stretching, although other directional movement such as downward, horizontal or angularly disposed will also produce the desired result.

It is to be understood, of course, that the orientation of the tubing may be done in a separate step which is separate from the continuous process herein illustrated. Also, film or sheet may be seamed along its longitudinal edges and the seamed tubing oriented and/or stabilized by the process herein described.

Oriented polyethylene terephthalate tubing, obtained by the process herein described and subsequently oriented at temperatures about its second-order transition temperature, is clear, transparent, tough and shrinkable. It is also heat sealable. Biaxially oriented poly m-xylylene adipamide tubing can also be oriented above its second-order transition temperature of about 68° C. to produce clear, tough film.

The oriented, shrinkable films are admirably suited for use wherein a skin tight fit around an irregularly shaped object is desired. A method that can be used is as follows: the item to be packaged is inserted into a loose fitting bag made of the seamless tubing having one end heat sealed, evacuating the air in the bag, sealing the other end of the bag, and thereafter heating the composite package above the second-order transition temperature to cause the film to shrink to conform to the contents of the package.

Polyethylene terephthalate tubing that has been blown, extruded and biaxially stretched and oriented was found to shrink almost instantly upon immersion in hot water at temperatures above 125° F.

In that embodiment wherein it is desired to provide film dimensionally stable to high temperatures, the polyethylene terephthalate film is heated to temperatures above its second-order transition temperature but below the temperature at which the film begins to lose molecular orientation and is crystallized under tension.

When molten polyethylene terephthalate extruded in the form of a seamless tubing is rapidly cooled to room temperature, an amorphous tubing is obtained which shows very little tendency to crystallize over long periods of time. The amorphous tubing when heated to about its second order transition temperature readily softens and changes from a brittle, inelastic substance to a rubbery, easily deformable and drawable material. In this drawable state, the polyethylene terephthalate tubing may be easily stretched by the application of relatively small forces to yield highly oriented films. Even at its second order transition temperature, the polyethylene terephthalate crystallizes slowly.

Crystallization is readily initiated in oriented polyethylene terephthalate films as it is exposed to higher temperatures. The rate of crystallization increases as the temperature rises to about 180° C. At temperatures above about 180° C. the rate of crystallization will tend to decrease. Also, at higher temperatures, viz. near the melting point, the film begins to lose some of the molecular orientation which had been imparted at the lower temperatures. An illustrative method of stabilizing an oriented polyethylene terephthalate film can be more readily understood by referring again to FIGURE 1. Biaxially stretched and oriented tubing is passed through the nips of squeeze rolls 38, heated in its passage through heating device 42, and then passed through the nip of squeeze rolls 44, and thereafter wound up on wind-up reel 48. The tubing is maintained under radial tension by inflating and maintaining a bubble of air between the squeeze rolls, and under machine direction tension by control of the speed of squeeze rolls 38 and 44. The biaxial tensions are maintained to provide for the minimum change in dimensions and it is preferred to maintain the temperature at that point at which maximum crystallization of the film occurs. The heating to crystallization temperatures may be by means of a tubular radiant heater similar to that of heater 34.

Figure 4:
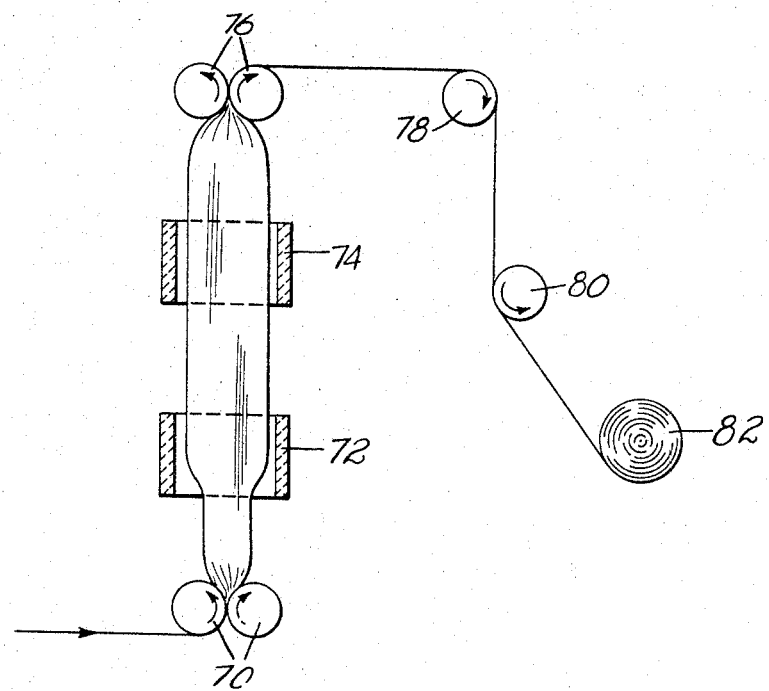
FIGURE 4 is a schematic illustration showing an alternative way of treating the film.

The oriented and stabilized polyethylene terephthalate tubing may be produced in a single inflated section such as shown in FIGURE 4.

In FIGURE 4, the amorphous polyethylene terephthalate tubing 16 is passed through a set of squeeze rolls 70, heated to a temperature for biaxial orientation as it passes through a heating device 72, further heated to effect crystallization and stabilization as it passes through a heating device 74 and is then passed through squeeze rolls 76 over guide rolls 78 and 80 and wound up on reel 82.

A bubble of air is maintained in the tubing between squeeze rolls 70 and 76 at a pressure sufficient to inflate the tubing to cause biaxial orientation or is adjacent to heating device 72 and to obtain the desired final dimensions after stabilization.

The heating devices 72 and 74 are similar in construction and operation to that shown in FIGURE 3. It is obvious that the heating devices can be combined into a single unit having zone or gradient heating.

The diameter and thickness of the amorphous tubing 16, the diameter and thickness of the stabilized tubing 16b, the linear velocity of the tubing through the heaters, the ratio of peripheral speeds of squeeze rolls 76 to that of squeeze rolls 70, the temperatures maintained in heating devices 72 and 74, and the internal pressure of the gas bubble maintained in the tubing between the squeeze rolls are all factors which affect the characteristics of the desired final product.

The crystallized, biaxially oriented film is clear, tough, transparent, and dimensionally heat stable to temperatures up to 120° C. or higher depending upon degree of crystallization obtained.

The process herein described can also be used to control the degree of shrinkage of the polyethylene terephthalate film. The time and temperature to which the biaxial oriented film is subjected during the stabilization stage will determine the degree of shrinkage.

Polyethylene terephthalate is a condensation type polymer obtained by reacting ethylene glycol and terephthalic acid under appropriate conditions. It is obvious that other material such as other glycols or acids, or pigments and other polymerizable monomers can be added to modify the polymer without appreciably detracting therefrom. The modifiers can be added as reactants during the polymerization process or may be separate materials melt-blended and extruded with the polymer.

While this invention has been described with particular reference to polyethylene terephthalate, it is to be understood that the invention is not restricted thereto.

Film forming polymers having low melt viscosities not ordinarily extrudable by the blown tube method can also be formed into continuous thin walled seamless tubing by the method of this invention.

The invention herein described is particularly suitable for the production of thin walled continuous seamless tubing having a wall thickness as low as 0.15 mil or lower and as high as 2 mils or higher, and it is also suitable for biaxial orientation of other crystalline polymers in tubular form.

Any inert gaseous medium that does not deleteriously affect the tubing being produced can be used as the inflating medium for causing radial expansion of the tubing, air is preferred.

Seamless tubing made by the process as described herein can be used as such or can be slit to form sheets.

The following examples wherein are set forth certain preferred embodiments further illustrate the principle and practice of this invention.

*Example 1*

The following procedure was used to produce concentric seamless tubes of low melt-viscosity thermoplastic polymer on the outside and the supporting thermoplastic polymer on the inside.

A polyamide obtained from the condensation of hexamethylene diamine and adipic acid was fed through the hopper of the extruder, which supplied the outer channel of the die, and was extruded conjointly with polyethylene being simultaneously fed through the extrusion apparatus to the inner channel of the die, as shown in FIGURES 1 and 2.

The die had an annular orifice of 0.030 inch with each channel opening 0.015 inch. The diameter between the inner lips of the die was 3 inches. The temperature of the die during extrusion was 560° F. The polyethylene used had a melt index of 0.6, a density of 0.92, a number average molecular weight of 25,000 and the viscosity of the melt at 560° F. of 30,000 poises. The polyamide that was used is commonly known as "Nylon 6–6" and had a melting point of 496° F.–515° F., and the viscosity of the melt at 560° F. was 1,500 poises.

The composite concentric tubes were withdrawn in a vertically upward direction from the die at the rate of 16 feet per minute by the draw rolls positioned above the die. Sufficient air was introduced interiorly to inflate the concentric tubes to a final diameter sufficient to produce a tubing of 9 inches flat width. As the molten concentric tubes issued from the die, they began to expand due to the gaseous bubble confined therein. The expanding concentric tubes were then passed through a cooling zone and drawn upwardly by the draw rolls, flattened and then wound up on a reel.

The average thickness of the outer polyamide tube was 1.3 mils while the inner polyethylene tube had an average thickness of 2.5 mils.

The polyamide film stripped in this instance from the polyethylene was translucent, crystalline and brittle. The properties of the film are listed below.

| | |
|---|---|
| Tensile strength | 7500–8700 |
| Elongation _____percent__ | 9–16 |
| Tear strength, grams/mil | 14–15 |
| Gas transmission: | |
|    Oxygen | No transmission |
|    Carbon dioxide | 15.2 |
| Moisture vapor transmission | 10.3 |

*Example II*

To produce concentric seamless tubes comprising polyethylene terephthalate on the outside and polyethylene on the inside, the following procedure was used:

The apparatus and procedure was the same as in Example I, except that polyethylene terephthalate having a viscosity of the melt at 560° F. of 2,000 poises and a melting point of 482° F.–509° F. was used, as the thermoplastic polymer comprising the outer tube, and the film was drawn at the rate of 17 feet per minute. The temperature of extrusion may be from 510° F. up to the temperature of degradation.

The average wall thickness of the concentric tubes was 1.7 mils for the polyethylene terephthalate and 1.9 mils for the polyethylene. The polyethylene terephthalate film stripped from the polyethylene was amorphous and had the following properties:

| | Machine Direction | Transverse Direction |
|---|---|---|
| Tensile strength | 7,700 | 7,200 |
| Elongation, Percent | 10 | 6 |
| Tear strength, g./mil | 25 | 22 |

*Example III*

To produce a composite seamless tubing comprising polyethylene terephthalate on the inside and polyethylene on the outside, the following procedure was used:

The apparatus and procedure was the same as in Example II, except that polyethylene terephthalate was fed into the hopper and extruder that fed the inner channel of the die and the polyethylene was fed into the hopper that feeds the outer channel of the die. The die temperature was maintained at 515° F. and a composite tubing of 5 inches in flat width was produced. The polyethylene terephthalate tube comprising the inner layer was amorphous as indicated by X-ray analysis. The wall thickness of the polyethylene terephthalate was 2 mils. The wall thickness of the polyethylene was 3 mils.

The amorphous polyethylene terephthalate film removed from the polyethylene had properties similar to that produced in Example II with tensile strengths of 5000 in the transverse direction and 6200 in the machine direction, an elongation of 4 percent to 5 percent and tear strengths of 26–29 grams per mil.

*Example IV*

To produce biaxially oriented polyethylene terephthalate seamless tubing the procedure was as follows:

The apparatus and procedure was the same as in Example III, except that the die was 1.5 inches in diameter, the roll speed was 20 feet per minute and the flat width of the flattened extruded composite tubing was 3 inches. The average wall thickness of the amorphous polyethylene terephthalate tubing was 3 mils and that of the polyethylene was 3 mils. After the composite concentric tubings were flattened, the outer layer of polyethylene was removed by using a suitable slitting device, and thereafter the amorphous polyethylene terephthalate tubing was wound up on a reel for use in the orientation experiments. The physical properties of the amorphous tubing are listed in Table I.

The orientation of the amorphous tubing was accomplished by the method shown in FIGURE 1. The amorphous polyethylene terephthalate tubing was passed over suitable guide rolls to squeeze rolls, subjected to heat in passing through a radiant heater and drawn and flattened by a second set of squeeze rolls positioned 8 feet above the first set. The tubing was thereafter passed over a suitable guide rolls and wound up on a reel. A bubble of air was maintained within the tubing between the two sets of squeeze rolls of sufficient pressure to distend the tubing radially to obtain the desired radial expansion. The peripheral speed of rolls of the upper squeeze rolls was greater than that of the lower squeeze rolls to allow for machine direction stretch herein termed draw ratio.

The inflated tubing after leaving the lower squeeze rolls was heated in its passage through the radiant heater and flattened by the upper squeeze rolls.

The cylindrical radiant heater comprised an outer housing 18 inches in height and having an internal diameter of 12 inches. Twelve 1000 watt electrical resistance heating elements evenly spaced about the inner circumference of the heater and controlled by a variable transformer provided the heat. The heater was positioned between the upper and lower sets of squeeze rolls. The temperature for each setting of the transformer control was determined and set as hereinafter set forth in Table I.

On entering the heater, the temperature of the amorphous tubing steadily increased at a rate which was dependent upon both the wall thickness of the film and the transformer control setting. At a well defined point, the draw point, the amorphous tubing expanded to yield the oriented tubing. The oriented polyethylene terephthalate tubing was transparent, tough, and would shrink at least 60 percent when immersed in water at 145° F. The results of the orientation experiments are tabulated below wherein the 3 inch flat width amorphous polyethylene terephthalate tubing was used for all the runs and the draw ratio is defined as the ratio of speeds of the top to the bottom squeeze rolls, i.e., the ratio of the output speed of the oriented film $V_o$, to the input speed of the amorphous film, $V_a$; and the expansion ratio is defined as the ratio of the diameter (or flat width) of the oriented tubing, $D_o$, to the diameter (or flat width) of the amortubing, $D_a$.

*Example V*

To produce thin seamless crystalline tubing that is dimensionally stable to heat, the following procedure was followed:

The oriented polyethylene terephthalate seamless tubing produced in the run of Example IV was unwound, passed over suitable guide rolls to a set of squeeze rolls at a film speed of 4 feet per minute. From these lower squeeze rolls the tubing was passed through a radiant heater, through an upper set of squeeze rolls, all similar to that described in Example IV, and then over suitable guide rolls to a wind-up reel.

Dimensional changes during the crystallization stage were minimized by keeping the tubing taut by maintaining a bubble of air in the tubing between the two sets of squeeze rolls, and maintaining the peripheral speeds of these rolls equal. Film speed for crystallization was 4 feet per minute.

The crystallized oriented tubing was clear, tough and was dimensionally stable up to temperatures of 240° F. In Table II are indicated the physical properties of the oriented and crystallized polyethylene terephthalate seamless tubing.

TABLE I.—PROPERTIES OF ORIENTED FILMS

| Example | Input Speed, ft./min. | Draw Ratio, Vo/Va | Expansion Ratio, Do/Da | Temperature, °F. | Average Film Thickness | Tensile Strength, p.s.i. | | Elongation at Break, percent | | Tear Strength, grams/mil | |
|---|---|---|---|---|---|---|---|---|---|---|---|
| | | | | | | M.D. | T.D. | M.D. | T.D. | M.D. | T.D. |
| Amorphous Film, 8 in. F.W. | | | | | 3.6 | 8,160 | 7,140 | 2 | 3 | 37 | 45 |
| 4a | 4.0 | 3.0 | 3.3 | 190 | 0.31 | 19,510 | 14,150 | 89 | 41 | 69 | 40 |
| 4b | 8.5 | 3.0 | 3.3 | 190 | 0.23 | 12,570 | 13,955 | 57 | 21 | 172 | 139 |
| 4c | 4.0 | 3.0 | 3.3 | 175 | 0.31 | 21,750 | 21,140 | 115 | 91 | 61 | 56 |
| 4d | 4.0 | 2.5 | 3.3 | 175 | 0.26 | 9,260 | 12,020 | 30 | 32 | 162 | 238 |
| 4e | 4.0 | 2.6 | 3.3 | 190 | 0.39 | 9,170 | 18,230 | 44 | 74 | 365 | 296 |
| 4f | 7.0 | 3.0 | 3.3 | 212 | 0.29 | 8,355 | 9,880 | 25 | 29 | 253 | 212 |
| 4g | 8.5 | 3.0 | 3.3 | 212 | 0.22 | 12,480 | 13,480 | 52 | 29 | 124 | 101 |

TABLE II.—PROPERTIES OF ORIENTED AND CRYSTALLINE FILM

| Run No. | Temperature, °F. | Average Film Thickness in inches | Tensile Strength, p.s.i. | | Elongation at break (percent) | | Tear Strength (g./mil) | | Moisture Vapor Transmission (g./100 sq.in./24 hrs./mil) | Oxygen Transmission (cc./100 sq.in./24 hrs./mil) |
|---|---|---|---|---|---|---|---|---|---|---|
| | | | M.D. | T.D. | M.D. | T.D. | M.D. | T.D. | | |
| 4d oriented film | | 0.26 | 9,260 | 12,020 | 30 | 32 | 162 | 238 | | |
| 5b | 200 | 0.22 | 10,810 | 14,750 | 17 | 17 | 89 | 113 | 2.19 | 8.7 |
| 5c | 335 | 0.28 | 8,400 | 16,360 | 9 | 34 | 89 | 223 | 1.47 | 7.0 |
| 5d | 365 | 0.31 | 17,150 | 7,960 | 44 | 21 | 116 | 138 | 1.33 | 11.1 |
| 5e | 400 | 0.20 | 15,650 | 20,410 | 32 | 30 | 55 | 84 | 1.32 | 7.4 |

The following is a glossary of terms employed throughout the present specification:

*Oxygen permeability.*—Oxygen transmission values in cubic centimeters per 100 square inches per 24 hours measured by the Todd Method, Paper Trade Journal, volume 118, No. 10, page 32, 1944.

*Moisture vapor permeability.*—Moisture vapor transmission measured by the General Foods Method, Modern Packaging, November 1942.

*Tear strength.*—TAPPI Method T 414M–49 (Tech. Assoc. of Pulp & Paper Industry) Tear strength is recorded in grams per $\frac{1}{1000}$ inch film thickness.

*Melt index.*—ASTM Test D1238–52T; ASTM Standards, 1952, Part 6, p. 736. The flow rate is rate of extrusion in grams per 10 minutes.

*Tensile strength.*—ASTM Test D882–54T–C; ASTM Standards on Plastics, October 1955, p. 222, Scott inclined plane tensile strength tester. A sample 1 inch long by ½ inch wide is used. Tensile strength is given in pounds per square inch based on original cross-section area of the sample.

*Elongation.*—ASTM Test D882–54T–C; ASTM Standard on Plastics, October 1955, p. 222. Determined on the same machine and sample as tensile strength.

*Density of polyethylene* is measured in grams per cubic centimeter in a gradient column made up of water, methanol and sodium acetate at 25° C.

*Melt-viscosity.*—Measurements are determined employing the Extrusion Plastometer of ASTM Test Procedure D–1238–52T, ASTM Standards, 1952, Part 6, page 736, and further described in Modern Plastics, volume 31, #3, page 146 (1953). Melt-viscosity is calculated for the equation:

$$(\text{melt-viscosity}) \ \eta = \frac{\text{shear stress}}{\text{rate of shear}}$$

$$\frac{Pr/2l}{4Q/\pi r^3} = \text{pounds (lb.) seconds (sec.)/inches (in.)}^2$$

$P$ = applied pressure in lb./in.$^2$.
$r$ = radium of die or capillary used expressed in inches.
$l$ = length of capillary expressed in terms of inches.
$Q$ = flow rate in in.$^3$/sec.
log-log plot of shear stress vs. rate of shear is extrapolated to a rate of shear of 1 sec.$^{-1}$ and $\eta$ at 1 sec.$^{-1}$ in poises = $6.895 \times 10^4 \times \eta$ at 1 sec.$^{-1}$ in lb. sec./in.$^2$.

Since it is obvious that various changes and modifications can be made in the above description without departing from the nature or spirit thereof, this invention is not restricted thereto except as set forth in the appended claims.

What is claimed is:

1. A method of producing continuous seamless tubing which comprises melt extruding a thermoplastic polymer having a low melt-viscosity at its extrusion temperature such that it is non-self-sustaining in the molten state upwardly through an inner annular orifice and onto a melt of a supporting thermoplastic polymer having a high melt-viscosity at its extrusion temperature such that it supports both itself and the low melt-viscosity polymer while in the molten state, said supporting thermoplastic polymer being simultaneously and concentrically extruded through an adjacent outer annular orifice upwardly parallel and exterior to and in contact with the low melt-viscosity thermoplastic polymer to form concentric layers of seamless polymeric tubing; continuously withdrawing the concentric tubings; constricting the concentric tubings at a point spaced from the point of extrusion and maintaining a bubble of a fluid medium under pressure in the tubing between the point of extrusion and the point of constriction to cause the distention thereof; and removing the outer high melt viscosity seamless tubing from the inner low melt viscosity seamless tubing.

2. A method as claimed in claim 1 wherein the thermoplastic polymer having a low melt-viscosity is polyethylene terephthalate.

3. A method as claimed in claim 1 wherein the melt of a high melt-viscosity supporting thermoplastic polymer is polyethylene.

4. A method as claimed in claim 1 wherein the thermoplastic polymer having a low melt-viscosity is polyethylene terephthalate the melt-viscosity thereof being less than 7000 poises; and wherein said melt of a high viscosity supporting thermoplastic polymer is polyethylene characterized by a melt-viscosity in the range of 10,000 poises to 200,000 poises at a temperature of from 350° F. to 600° F.

5. A method as claimed in claim 1 wherein the thermoplastic polymer having a low melt-viscosity is polyethylene terephthalate the melt-viscosity thereof being in the range of 500 poises to 7000 poises; and wherein said melt of a high-viscosity supporting thermoplastic polymer is polyethylene characterized by a melt-viscosity in the range of 10,000 poises to 200,000 poises at a temperature of from 350° F. to 600° F., and a density of at least 0.90.

6. A method of producing continuous seamless polymeric tubing which comprises melt extruding polyethylene terephthalate having a low melt-viscosity at its extrusion temperature such that it is non-self-sustaining in the molten state at a temperature of at least 510° F. through an annular orifice and onto a supporting melt of polyethylene, said polyethylene being simultaneously and concentrically extruded at a temperature of at least 510° F. through an adjacent annular orifice parallel to and in contact with said polyethylene terephthalate to form concentric layers of seamless polymeric tubing; continuously withdrawing said concentric tubings; constricting said concentric tubings at a point spaced from the point of extrusion and maintaining a bubble of fluid medium under pressure in the tubing between the point of extrusion and the point of constriction to cause the distention thereof; and removing the outer concentric tubing from the inner concentric tubing.

7. A method of producing continuous seamless tubing which comprises melt extruding a thermoplastic polymer having a low melt-viscosity at its extrusion temperature such that it is non-self-sustaining in the molten state upwardly through an inner annular orifice and onto a melt of a thermoplastic polymer having a high melt-viscosity at its extrusion temperature such that it supports both itself and the low melt-viscosity polymer while in the molten state, said supporting thermoplastic polymer being simultaneously and concentrically extruded through an adjacent outer annular orifice upwardly parallel and exterior to and in contact with the low melt-viscosity thermoplastic polymer to form concentric layers of seamless polymeric tubing; continuously withdrawing the concentric tubings; flattening the concentric tubings at a point spaced from the point of extrusion and maintaining a bubble of a fluid medium under pressure in the tubing between the point of extrusion and the point of flattening to cause the distention thereof, removing said outer tubing of high melt-viscosity thermoplastic polymer from said inner seamless tubing of low melt-viscosity thermoplastic polymer, and subsequently passing a continuous length of said latter seamless polymeric tubing through a heated zone, simultaneously introducing and maintaining therein a constant continuous isolated bubble of a fluid medium and stretching said low melt-viscosity tubing to cause biaxial orientation thereof, the heat in said zone maintaining the temperature of said tubing below the melting point of said low melt-viscosity polymeric film and above the temperature at which the low melt-viscosity polymeric film becomes drawable to cause the biaxial orientation thereof and subsequently flattening the tubing at a point spaced from the point of expansion thereof; passing a continuous length of said biaxially oriented seamless polymeric tubing through a heated zone and simultaneously introducing therein a constant continuous isolated bubble of a fluid medium under pressure, the heat in said zone maintaining the temperature of said tubing below the melting point of said low melt-viscosity polymeric film and above the temperature at which the low melt-viscosity polymeric film becomes drawable, to cause the substantial stabilization of said tubing against shrinkage.

8. A method as claimed in claim 7 wherein the thermoplastic polymer having a low melt-viscosity is polyethylene terephthalate.

9. A method as claimed in claim 7 wherein the melt of a high melt-viscosity supporting thermoplastic polymer is polyethylene.

10. A method as claimed in claim 7 wherein the thermoplastic polymer having a low melt-viscosity is polyethylene terephthalate the melt-viscosity thereof being less than 7000 poises; and wherein said melt of a high viscosity supporting thermoplastic polymer is polyethylene characterized by a melt-viscosity in the range of 10,000 poises to 200,000 poises at a temperature of from 350° F. to 600° F.

11. A method as claimed in claim 7 wherein the thermoplastic polymer having a low melt-viscosity is polyethylene terephthalate the melt-viscosity thereof being in the range of 500 poises to 7000 poises; and wherein said melt of a high-viscosity supporting thermoplastic polymer is polyethylene characterized by a melt-viscosity in the range of 10,000 poises to 200,000 poises at a temperature of from 350° F. to 600° F., and a density of at least 0.90.

12. A method of producing continuous seamless tubing which comprises melt extruding a thermoplastic polymer having a low melt-viscosity at its extrusion temperature such that it is non-self-sustaining in the molten state upwardly through an inner annular orifice and onto a melt of a thermoplastic polymer having a high melt-viscosity at its extrusion temperature such that it supports both itself and the low melt-viscosity polymer while in the molten state; said supporting thermoplastic polymer being simultaneously and concentrically extruded through an adjacent outer annular orifice upwardly parallel and exterior to and in contact with the low melt-viscosity thermoplastic polymer, to form concentric layers of seamless polymeric tubing; continuously withdrawing the concentric tubings; flattening the concentric tubings at a point spaced from the point of extrusion and maintaining a bubble of a fluid medium under pressure in the tubing between the point of extrusion and the point of flattening to cause the distention thereof, removing said outer tubing of high melt-viscosity thermoplastic polymer from said inner seamless tubing of low melt-viscosity thermoplastic polymer, and subsequently passing a continuous length of said latter seamless polymeric tubing through a heated zone, simultaneously introducing and maintaining therein a constant continuous isolated bubble of a fluid medium under pressure and stretching said low-melt viscosity tubing to cause biaxial orientation thereof, the heat in said zone maintaining the temperature of said tubing below the melting point of said low melt-viscosity polymeric film and above the temperature at which the low melt-viscosity polymeric film becomes drawable to cause the biaxial orientation thereof.

13. A method as claimed in claim 7 wherein the thermoplastic polymer having a low melt-viscosity at its extrusion temperature is polyethylene terephthalate and wherein the thermoplastic polymer having a high melt-viscosity at its extrusion temperature is polyethylene.

14. A method of producing continuous seamless tubing which comprises melt extruding a thermoplastic polymer having a low melt-viscosity at its extrusion temperature such that it is non-self-sustaining in the molten state through an inner annular orifice and onto a melt of a thermoplastic polymer having a high melt-viscosity at its extrusion temperature such that it supports both itself and the low melt-viscosity polymer while in the molten state, said supporting thermoplastic polymer being simultaneously and concentrically extruded through an adjacent outer annular orifice parallel and exterior to and in contact with the low melt-viscosity thermoplastic polymer to form concentric layers of seamless polymeric tubing; continuously withdrawing the concentric tubings; flattening the concentric tubings at a point spaced from the point of extrusion and maintaining a bubble of a fluid medium under pressure in the tubing between the point of extrusion and the point of flattening to cause the distention thereof, removing said outer tubing of high melt-viscosity thermoplastic polymer from said inner seamless tubing of low melt-viscosity thermoplastic polymer, and subsequently passing a continuous length of said latter seamless polymeric tubing through a heated zone, simultaneously introducing and maintaining therein a constant cotinuous isolated bubble of a fluid medium and stretching said low melt-viscosity tubing to cause biaxial orientation thereof, the heat in said zone maintaining the temperature of said tubing below the melting point of said low melt viscosity polymeric film and above the temperature at which the low melt-viscosity polymeric film becomes drawable to cause the biaxial orientation thereof and subsequently flattening the tubing at a point spaced from the point of expansion thereof; passing a continuous length of said biaxially oriented seamless polymeric tubing through a heated zone and simultaneously introducing therein a constant continuous isolated bubble of a fluid medium under pressure, the heat in said zone maintaining the temperature of said tubing below the melting point of said low melt-viscosity polymeric film and above the temperature at which the low melt-viscosity polymeric film becomes drawable, to cause the substantial stabilization of said tubing against shrinkage.

15. A method of producing continuous seamless tubing which comprises extruding a thermoplastic polymer having a low melt-viscosity at its extrusion temperature such that it is non-self sustaining in the molten state through an annular orifice and onto a melt of a supporting thermoplastic polymer having a high melt-viscosity at its extrusion temperature such that it supports both itself and the low melt-viscosity polymer while in the molten state, the supporting thermoplastic polymer being simultaneously and concentrically extruded through an adjacent annular orifice, into contact with the low melt-viscosity thermoplastic polymer to form concentric layers of seamless polymeric tubing, maintaining the walls of the tubings distended and subsequently separating the high melt-viscosity seamless tubing from the low melt-viscosity seamless tubing.

16. A method as defined in claim 15 wherein the low melt-viscosity polymer is a polyolefine.

17. A method as defined in claim 15 wherein the low melt-viscosity polymer is a polyester.

18. A method as defined in claim 15 wherein the low melt-viscosity polymer is a polyamide.

19. A method as defined in claim 15 wherein the low melt-viscosity polymer is a polyamide formed on reacting adipic acid and hexamethylene diamine.

20. A method as defined in claim 15 wherein the low melt-viscosity polymer is polyethylene terephthalate.

21. A method as defined in claim 15 wherein the high melt-viscosity polymer is polyethylene.

References Cited
UNITED STATES PATENTS

| | | |
|---|---|---|
| 2,592,658 | 4/1952 | Colombo. |
| 2,597,975 | 5/1952 | Colombo _____ 264—290 X |
| 2,688,773 | 9/1954 | McIntire _____ 264—95 X |
| 2,710,987 | 6/1955 | Sherman. |
| 2,753,596 | 7/1956 | Bailey. |

ROBERT F. WHITE, *Primary Examiner.*

A. R. NOE, *Assistant Examiner.*